US012653142B2

(12) United States Patent
Zhang et al.

(10) Patent No.: US 12,653,142 B2
(45) Date of Patent: Jun. 16, 2026

(54) AUTOMATIC PET LITTER ADDING DEVICE AND CAT LITTER BOX

(71) Applicant: Shenzhen Shouzheng Chuqi Technology Co., Ltd., Shenzhen (CN)

(72) Inventors: Yuyang Zhang, Shenzhen (CN); Jin Li, Shenzhen (CN)

( * ) Notice: Subject to any disclaimer, the term of this patent is extended or adjusted under 35 U.S.C. 154(b) by 141 days.

(21) Appl. No.: 18/764,254

(22) Filed: Jul. 4, 2024

(65) Prior Publication Data

US 2025/0380662 A1      Dec. 18, 2025

(30) Foreign Application Priority Data

Jun. 18, 2024      (CN) .......................... 202421384414.4

(51) Int. Cl.
*A01K 1/01* (2006.01)
(52) U.S. Cl.
CPC .................................. *A01K 1/0114* (2013.01)
(58) Field of Classification Search
CPC ..... A01K 1/0114; A01K 1/0107; G01F 11/10; G01F 11/24; A47K 5/1217
USPC ................................ 222/367, 368, 63, 185.1
See application file for complete search history.

(56) References Cited

U.S. PATENT DOCUMENTS

| | | | | | |
|---|---|---|---|---|---|
| 5,003,920 | A | * | 4/1991 | Miksitz .................. | A01K 1/011 |
| | | | | | 119/163 |
| 5,626,260 | A | * | 5/1997 | Waldner .................. | G01F 11/24 |
| | | | | | 222/144.5 |
| 7,013,796 | B2 | * | 3/2006 | Smit ........................ | G01F 11/24 |
| | | | | | 99/289 R |
| 8,555,818 | B2 | * | 10/2013 | Gordon ................ | A01K 1/0114 |
| | | | | | 119/166 |
| 9,902,561 | B2 | * | 2/2018 | Tummala ................ | G01F 13/00 |
| 12,457,990 | B2 | * | 11/2025 | Wei .......................... | H05B 3/34 |
| 2010/0264170 | A1 | * | 10/2010 | Chiu ........................ | G01F 11/24 |
| | | | | | 222/239 |
| 2020/0281154 | A1 | * | 9/2020 | Li ............................ | A01K 1/011 |
| 2023/0270292 | A1 | * | 8/2023 | Snediker ................ | A47J 47/01 |
| | | | | | 222/414 |
| 2023/0363348 | A1 | * | 11/2023 | Pan ....................... | A01K 1/0114 |

* cited by examiner

*Primary Examiner* — Kimberly S Berona
*Assistant Examiner* — Nevena Aleksic
(74) *Attorney, Agent, or Firm* — Daniel M. Cohn; Howard M. Cohn

(57) ABSTRACT

The present disclosure provides an automatic pet litter adding device, comprising: a pet litter cabin, a support plate, a pet litter adding component, a motor assembly; wherein: the bottom of the pet litter cabin is provided with a first pet litter outlet; the support plate is provided with a pet litter dividing trough, the bottom of the pet litter dividing trough is provided with a second pet litter outlet, the pet litter adding component is rotatably arranged in the pet litter dividing trough. When the pet litter adding component rotates, the cat litter in the pet litter cabin slides to the pet litter dividing area. The cat litter in the pet litter dividing area is pushed to the second pet litter outlet, and slides from the second pet litter outlet to the designated area.

9 Claims, 11 Drawing Sheets

AUTOMATIC PET LITTER ADDING DEVICE AND CAT LITTER BOX

TECHNICAL FIELD

The present disclosure relates to a technical field of cat litter boxes, and in particular to an automatic pet litter adding device and cat litter box.

BACKGROUND

With the improvement of living standards, more and more users are willing to relieve the pressure of life and work by raising pets. In the process of raising pets, users generally use pet excrement disposal devices (such as cat litter boxes) to deal with pet excrement (such as cat urine and feces).

However, the existing smart cat litter box will automatically clean the cat feces after the cat has finished defecating. Some cat litter will be consumed each time the cat feces are cleaned, which can easily lead to insufficient cat litter. When the cat litter is insufficient, the cat feces cannot clump and cannot be wrapped and dried in time, causing the cat feces to remain and stick together and cannot be completely cleaned. Therefore, the user needs to manually add cat litter to the cat litter box frequently, which is troublesome and brings great inconvenience to the user, resulting in a poor user's experience.

SUMMARY

The present disclosure provides an automatic pet litter adding device, in order to solve the problems that cat litter needs to be added manually in the existing cat litter box.

The working process of the automatic pet litter adding device of the present application is as follows: the automatic pet litter adding device, comprising: a pet litter cabin, a support plate, a pet litter adding component, a motor assembly; wherein: the bottom of the pet litter cabin is provided with a first pet litter outlet; the support plate is provided with a pet litter dividing trough located at the bottom of the first pet litter outlet, the bottom of the pet litter dividing trough is provided with a second pet litter outlet, and the first pet litter outlet and the second pet litter outlet are staggered; the pet litter adding component is rotatably arranged in the pet litter dividing trough, the pet litter adding component divides the pet litter dividing area in the pet litter dividing trough, when the pet litter adding component rotates, the cat litter in the pet litter cabin slides to the pet litter dividing area, and the cat litter in the pet litter dividing area is pushed to the second pet litter outlet, and slides from the second pet litter outlet to the designated area; the output end of the motor assembly is connected to the pet litter adding component.

Furthermore, the pet litter adding component comprises a pet litter dividing component and a rotating shaft component, the bottom of the pet litter cabin is provided with a pair of blocks, and the pair of blocks are provided on both sides of the first pet litter outlet, the pet litter dividing component comprises at least two fan-shaped cylindrical parts and a rotating cylinder part, the rotating cylinder part is rotatably sleeved on the rotating shaft component, the two fan-shaped cylindrical parts are arranged on the rotating cylinder part, the top surface of the fan-shaped cylindrical parts are adjacent to the bottom of the blocks, at least two pet litter dividing areas are formed between the fan-shaped cylindrical part and the inner wall of the pet litter dividing trough, the size of the top surface of the fan-shaped cylindrical parts and the size of the pet litter dividing areas are respectively matched with the size of the first pet litter outlet and the size of the second pet litter outlet, when the pet litter dividing component rotates, the two pet litter dividing areas pass through the first pet litter outlet or the second pet litter outlet, and the cat litter in the pet litter cabin slides from the first pet litter outlet to the pet litter dividing areas, or the cat litter in the pet litter dividing areas slides from the second pet litter outlet to the designated area.

Furthermore, the top of the rotating shaft component penetrates the bottom of the pet litter cabin and extends into the pet litter cabin, and a stirring member is arranged on the top of the rotating shaft component.

Furthermore, the blocks are arranged in a comb shape, and the gap between comb teeth of the comb shape blocks is smaller than the diameter of the pet litter.

Furthermore, it also includes a shell, the pet litter cabin, the support plate, the pet litter adding component and the motor assembly are all arranged in the shell, the shell is provided with an opening, and a slide is provided at the bottom of the support plate, one end of the slide abuts against the second pet litter outlet, and the other end of the slide passes through the opening and extends to the designated area.

Furthermore, the top of the shell is provided with a cabin cover, one side of the cabin cover is rotatably connected to the shell.

Furthermore, the shell is also provided with a clamping piece.

Furthermore, the pet litter cabin is arranged in an inverted cone shape.

Furthermore, in order to solve the above problems, the present invention also provides a cat litter box, wherein it comprises a base, a drum rotatably arranged on the base, a driving assembly for driving the drum to rotate, and the automatic pet litter adding device of one of the above embodiments, wherein the automatic pet litter adding device is connected to the base, and the second pet litter outlet of the automatic pet litter adding device is connected to the inside of the drum.

Furthermore, it also comprises a controller and a data plug, the data plug and the driving assembly are electrically connected to the controller respectively, the automatic pet litter adding device also comprises a communication interface, the communication interface is electrically connected to the motor assembly of the automatic pet litter adding device, when the automatic pet litter adding device is set on the base, the data plug is inserted into the communication interface, and the controller is provided with a wireless connection module.

The present disclosure has beneficial effects as follows.

The present disclosure provides an automatic pet litter adding device. By arranging a pet litter adding component at the bottom of the pet litter cabin, the cat litter in the pet litter cabin slides from the first pet litter outlet to the pet litter dividing area of the pet litter dividing trough. And then, driven by the motor assembly, the pet litter adding component rotates, and the cat litter in the pet litter dividing area is pushed to the second pet litter outlet, and slides from the second pet litter outlet into the cat litter box. When cat litter is not needed, the pet litter adding component stops pushing the cat litter in the pet litter dividing area to the second pet litter outlet, and the cat litter in the pet litter cabin stops being added to the cat litter box, thereby realizing automatic cat litter adding to the cat litter box, without the need for manual cat litter adding, and improving the user experience. In addition, the arrangement of the cat litter dividing areas allows cat litter to be added to the cat litter box in a quantitative manner, without adding too much or too little, thereby ensuring that the amount of cat litter added is sufficient to prevent cat feces in the cat litter box from unable clumping, and ensuring that the cat litter is not added excessively to affect the normal use of the cat litter box.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

REFERENCE NUMBER IN THE DRAWINGS

Figure 1:
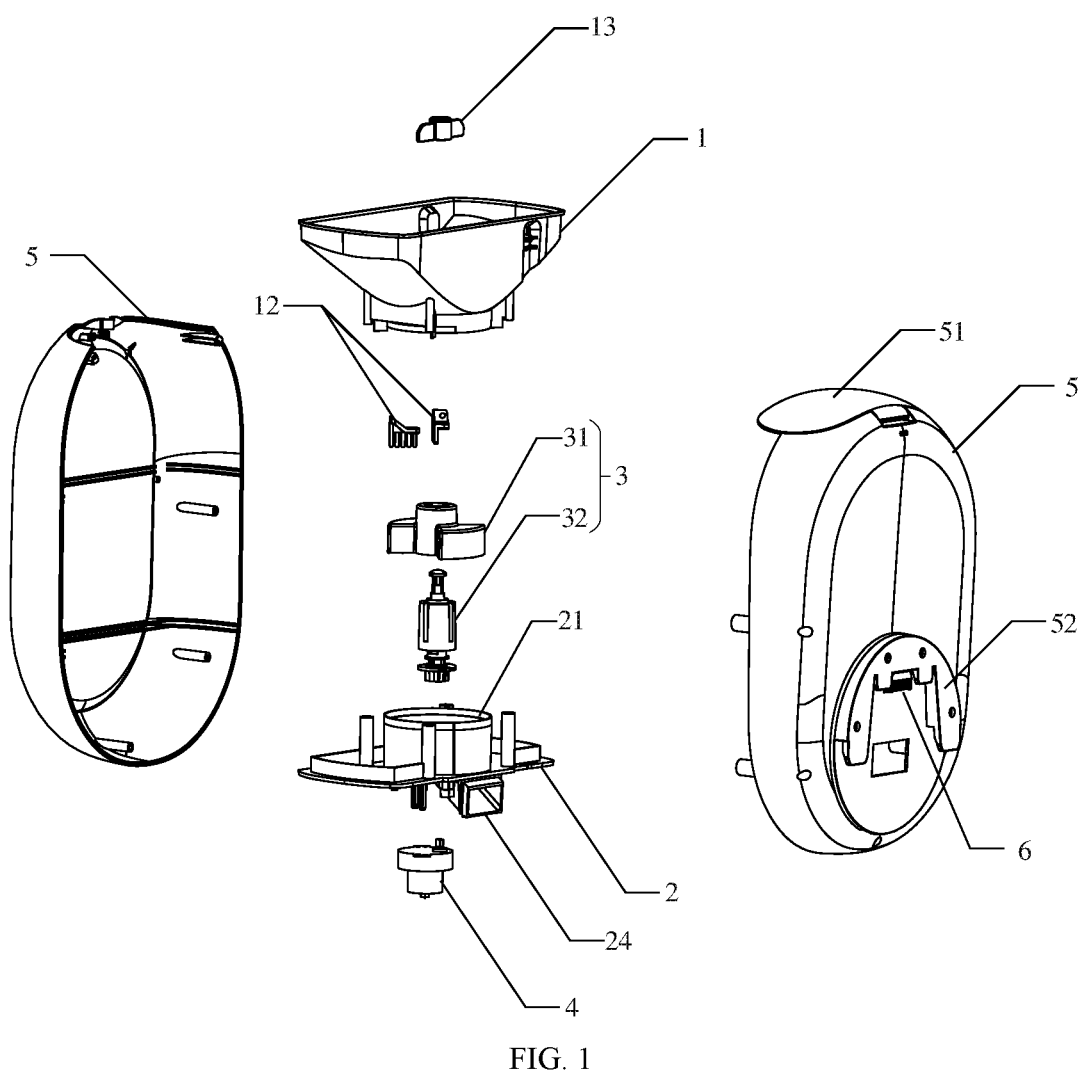
FIG. 1 is a schematic diagram of the decomposition structure of an embodiment of an automatic pet litter adding device.
Figure 2:
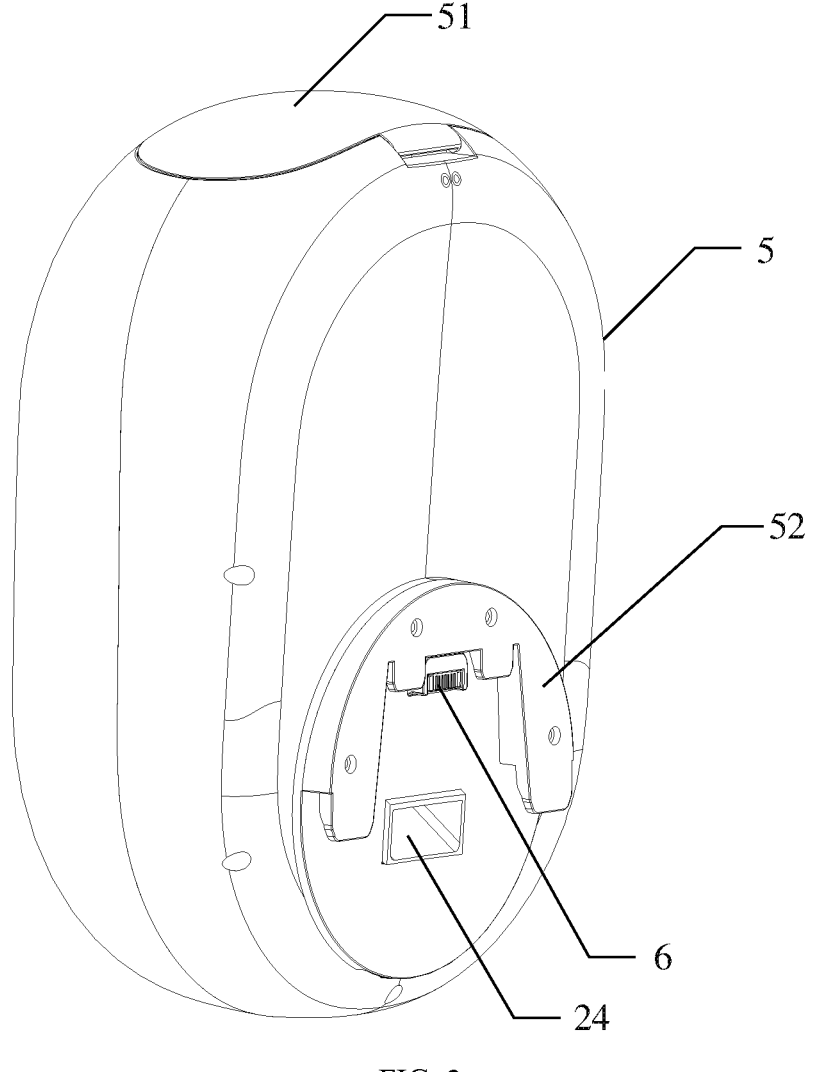
FIG. 2 is a schematic diagram of the overall structure of an embodiment of the automatic pet litter adding device.
Figure 3:
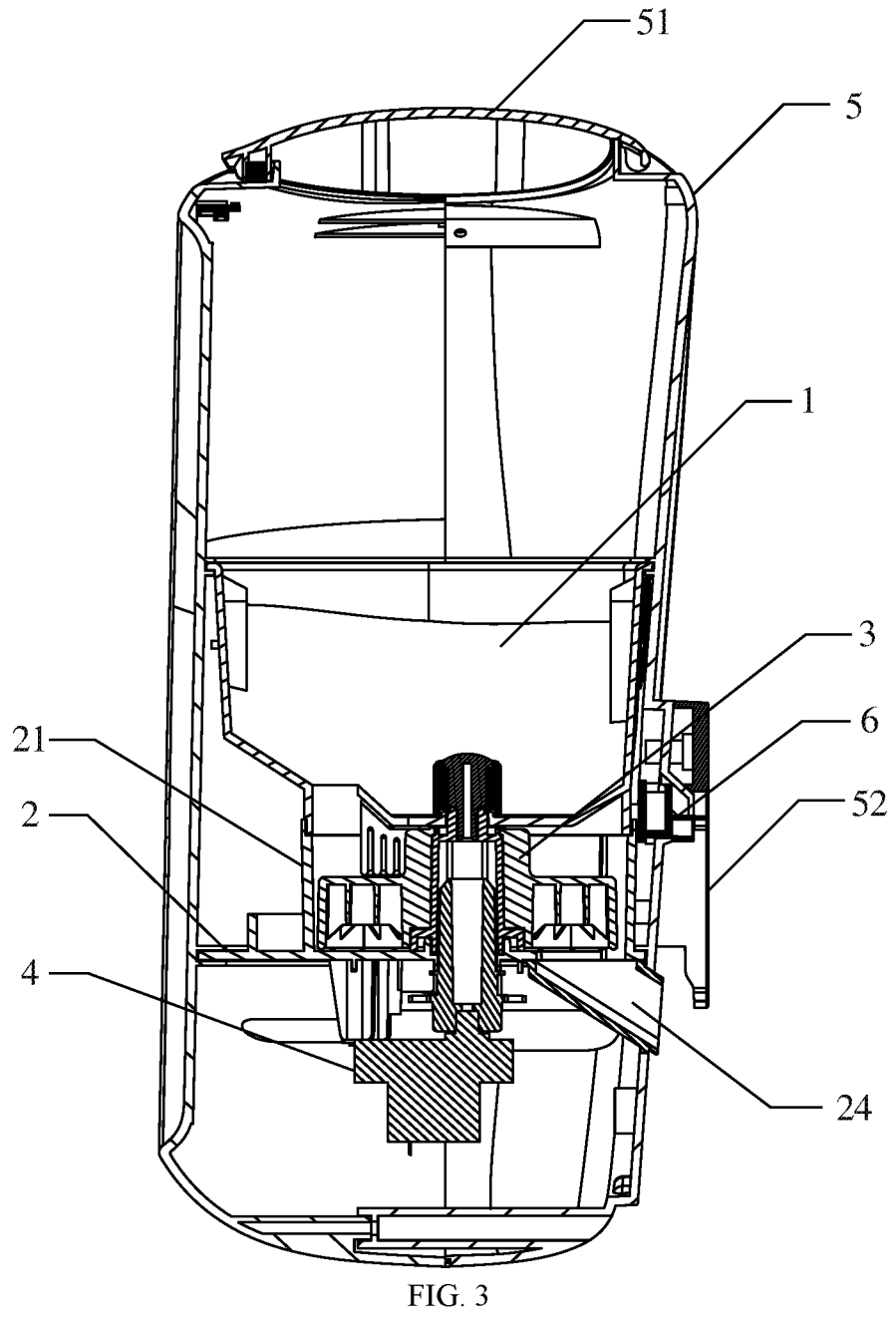
FIG. 3 is a schematic diagram of the cross-sectional structure of an embodiment of the automatic pet litter adding device.
Figure 4:
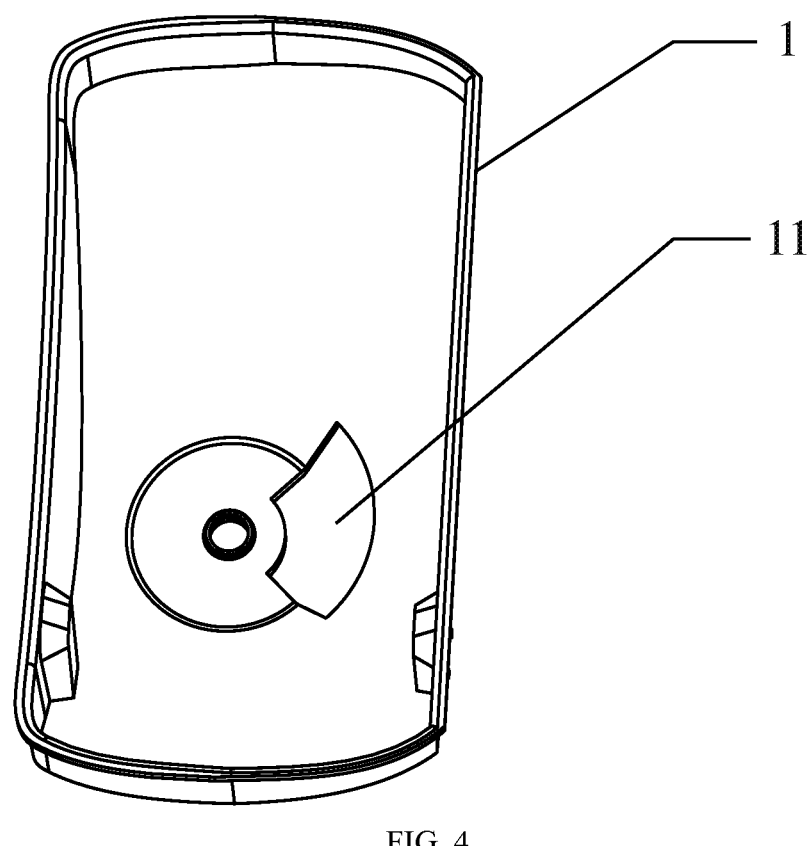
FIG. 4 is a schematic diagram of the structure of the pet litter cabin of an embodiment of the automatic pet litter adding device.
Figure 5:
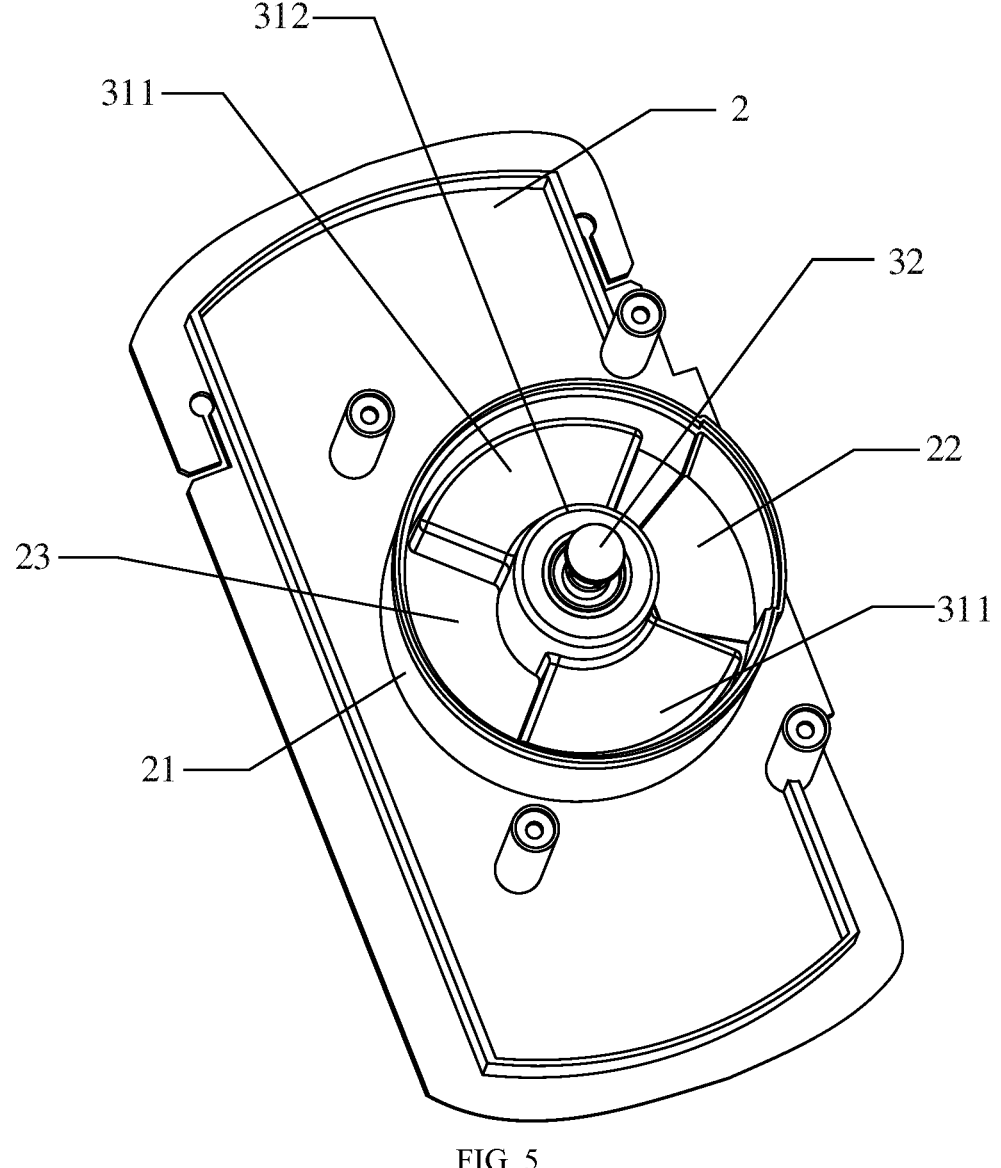
FIG. 5 is a schematic diagram of the partial structure of an embodiment of the automatic pet litter adding device.

| | | | | | |
|---|---|---|---|---|---|
| pet litter cabin | 1 | support plate | 2 | | |
| pet litter adding component | 3 | motor assembly | 4 | | |
| shell | 5 | communication interface | 6 | | |
| first pet litter outlet | 11 | block | 12 | | |
| stirring member | 13 | pet litter dividing trough | 21 | | |
| second pet litter outlet | 22 | pet litter dividing area | 23 | | |
| slide | 24 | pet litter dividing component | 31 | | |
| rotating cylinder part | 312 | fan-shaped cylindrical part | 311 | | |
| rotating shaft component | 32 | clamping piece | 52 | | |
| base | 100 | drum | 200 | | |
| automatic pet litter adding device | 300 | data plug | 500 | | |
| snap-fitting socket | 1001 | excretion cabin | 2001 | | |
| pet litter temporary storage cabin | 2002 | cat feces collection cabin | 2003 | | |
| mesh screen | 2004 | entrance | 2005 | | |
| cabin door | 2006 | | | | |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

FIG. 1 to FIG. 5 show the structural schematic diagrams of an embodiment of an automatic pet litter adding device of the present invention. Referring to FIG. 1 to FIG. 5, the embodiment of the present disclosure provides an automatic pet litter adding device, comprising: a pet litter cabin 1, a support plate 2, a pet litter adding component 3, a motor assembly 4; wherein: the bottom of the pet litter cabin 1 is provided with a first pet litter outlet 11; the support plate 2 is provided with a pet litter dividing trough 21 located at the bottom of the first pet litter outlet 11, the bottom of the pet litter dividing trough 21 is provided with a second pet litter outlet 22, and the first pet litter outlet 11 and the second pet litter outlet 22 are staggered; the pet litter adding component 3 is rotatably arranged in the pet litter dividing trough 21, the pet litter adding component 3 divides the pet litter dividing area 23 in the pet litter dividing trough 21, when the pet litter adding component 3 rotates, the cat litter in the pet litter cabin 1 slides to the pet litter dividing area 23, and the cat litter in the pet litter dividing area 23 is pushed to the second pet litter outlet 22, and slides from the second pet litter outlet 22 to the designated area; the output end of the motor assembly 4 is connected to the pet litter adding component 3. It should be noted that the pet litter dividing trough 21 can be divided into a plurality of pet litter dividing areas 23, and the staggered arrangement of the first pet litter outlet 11 and the second pet litter outlet 22 enables the pet litter dividing area 23 to be connected only to the first pet litter outlet 11 or to the second pet litter outlet 22, and will not be connected to the first pet litter outlet 11 and the second pet litter outlet 22 at the same time, thereby realizing the pet litter dividing function. The pet litter dividing area 23 can also control the amount of pet litter added when adding pet litter, so as to avoid adding too much or too little pet litter. The output end of the motor assembly 4 is connected to the pet litter adding component 3, and is used to drive the pet litter adding component 3 to rotate in the pet litter dividing trough 21.

Specifically, when pet litter needs to be added to the cat litter box, the motor assembly 4 drives the pet litter adding component 3 to rotate. When the pet litter section 23 is connected to the first pet litter outlet 11, the pet litter slides from the first pet litter outlet 11 into the pet litter dividing area 23. Then, driven by the motor assembly 4, the pet litter adding component 3 continues to rotate until the pet litter dividing area 23 is connected to the second pet litter outlet 22, and the pet litter in the pet litter section 23 slides from the second pet litter outlet 22 into the cat litter box, thereby realizing automatic adding pet litter to the cat litter box.

In the embodiment, by arranging the pet litter adding component 3 at the bottom of the pet litter cabin 1, the cat litter in the pet litter cabin 1 slides from the first pet litter outlet 11 to the pet litter dividing area 23 of the pet litter dividing trough 21. And then, driven by the motor assembly 4, the pet litter adding component 3 rotates, and the cat litter in the pet litter dividing area 23 is pushed to the second pet litter outlet 22, and slides from the second pet litter outlet 22 into the cat litter box. When pet litter is not needed, the pet litter adding component 3 stops pushing the cat litter in the pet litter dividing area 23 to the second pet litter outlet 22, and the cat litter in the pet litter cabin 1 stops being added to the cat litter box, thereby realizing automatic pet litter adding to the cat litter box, without the need for manual pet litter adding, and improving the user experience. In addition, the arrangement of the pet litter dividing areas 23 allows pet litter to be added to the cat litter box in a quantitative manner, without adding too much or too little, thereby ensuring that the amount of pet litter added is sufficient to prevent cat feces in the cat litter box from unable clumping, and ensuring that the pet litter is not added excessively to affect the normal use of the cat litter box.

Furthermore, the pet litter adding component 3 comprises a pet litter dividing component 31 and a rotating shaft component 32, the bottom of the pet litter cabin 1 is provided with a pair of blocks 12, and the pair of blocks 12 are provided on both sides of the first pet litter outlet 11, the pet litter dividing component 3 comprises at least two fan-shaped cylindrical parts 311 and a rotating cylinder part 312, the rotating cylinder part 312 is rotatably sleeved on the rotating shaft component 32, the two fan-shaped cylindrical parts 311 are arranged on the rotating cylinder part 312, the top surface of the fan-shaped cylindrical parts 312 are adjacent to the bottom of the blocks 12, at least two pet litter dividing areas 23 are formed between the fan-shaped cylindrical part 311 and the inner wall of the pet litter dividing trough 23, the size of the top surface of the fan-shaped cylindrical parts 311 and the size of the pet litter dividing areas 23 are respectively matched with the size of the first pet litter outlet 11 and the size of the second pet litter outlet 22, when the pet litter dividing component 3 rotates, the two pet litter dividing areas 23 pass through the first pet litter outlet 11 or the second pet litter outlet 22, and the cat litter in the pet litter cabin 1 slides from the first pet litter outlet 11 to the pet litter dividing areas 23, or the cat litter in the pet litter dividing areas 23 slides from the second pet litter outlet 22 to the designated area.

It should be noted that the fan-shaped column parts 311 have a certain height, and the pet litter dividing areas 23 are formed between the two fan-shaped column parts 311 and the inner wall of the pet litter dividing trough 21, and when the pet litter dividing component 31 rotates, the top surface of the fan-shaped column parts 311 just slide close to the bottom end of the blocks 12.

Specifically, when pet litter needs to be added, the motor assembly 4 drives the pet litter dividing component 31 to rotate, and the fan-shaped column parts 311 start to rotate until the pet litter dividing area 23 is connected to the first pet litter outlet 11, and then the cat litter in the pet litter cabin 1 slides from the first pet litter outlet 11 to the pet litter dividing area 23, and the pet litter dividing component 31 continues to rotate, and the pet litter dividing area 23 starts to move away from the first pet litter outlet 11. The cat litter in the pet litter dividing area 23 which is higher than the fan-shaped column parts 311 will not rotate with the rotation of the pet litter dividing area 23 due to the obstruction of the blocks 12, but will fall on the next fan-shaped column parts 311 that slide to the bottom of the first pet litter outlet 11 due to the obstruction of the blocks 12. The cooperation of the blocks 12 can make the amount of cat litter in the pet litter dividing area 23 constant, so that pet litter can be added to the cat litter box in a quantitative manner.

Furthermore, the top of the rotating shaft component 32 penetrates the bottom of the pet litter cabin 1 and extends into the pet litter cabin 1, and a stirring member 13 is arranged on the top of the rotating shaft component 32.

Specifically, when pet litter is added, the rotating shaft component 32 rotates to drive the stirring member 13 to rotate, and the stirring member 13 stirs the pet litter in the pet litter bin 1 so that the pet litter can slide more smoothly from the first pet litter outlet 11 to the pet litter dividing trough 21.

Furthermore, the blocks 12 are arranged in a comb shape, and the gap between comb teeth of the comb shape blocks is smaller than the diameter of the pet litter. Specifically, the blocks 12 arranged in a comb shape can better block the pet litter beyond the top surface of the fan-shaped column part 311, thereby preventing the blocks 12 from getting stuck with the fan-shaped column part 311.

Furthermore, the automatic pet litter adding device includes a shell 5, the pet litter cabin 1, the support plate 2, the pet litter adding component 3 and the motor assembly 4 are all arranged in the shell 5, the shell 5 is provided with an opening, and a slide 24 is provided at the bottom of the support plate 2, one end of the slide 24 abuts against the second pet litter outlet 22, and the other end of the slide 24 passes through the opening and extends to the designated area.

Specifically, by providing the shell 5, on the one hand, it can protect the pet litter cabin 1, the support plate 2, the pet litter adding component 3 and the motor assembly 4, and on the other hand, it can be used to expand the volume of the pet litter cabin 1 so that the pet litter cabin 1 can accommodate more pet litter.

Furthermore, the top of the shell 5 is provided with a cabin cover 51, one side of the cabin cover 51 is rotatably connected to the shell 5.

Specifically, the cabin cover 51 can be rotated to open when adding pet litter to the pet litter cabin 1, so that the users can add pet litter to the pet litter cabin 1 conveniently.

Furthermore, the shell 5 is also provided with a clamping piece 52.

Specifically, the clamping piece 52 is used for being mounted on the cat litter box.

Furthermore, the pet litter cabin 1 is arranged in an inverted cone shape.

Specifically, the pet litter cabin 1 is set to an inverted cone shape, and the first pet litter outlet 11 is set at the bottom of the pet litter cabin 1, so that the cat litter in the pet litter cabin 1 can slide out of the first pet litter outlet 11 better.

Furthermore, the automatic pet litter adding device also comprises a communication interface 6, the communication interface 6 is arranged on the shell 5 and is electrically connected to the motor assembly 4.

Specifically, the communication interface 6 is used to be electrically connected to the control module of the cat litter box, so as to receive a control signal sent by the control module of the cat litter box, and control the motor assembly 4 to work according to the control signal.

Figure 6:
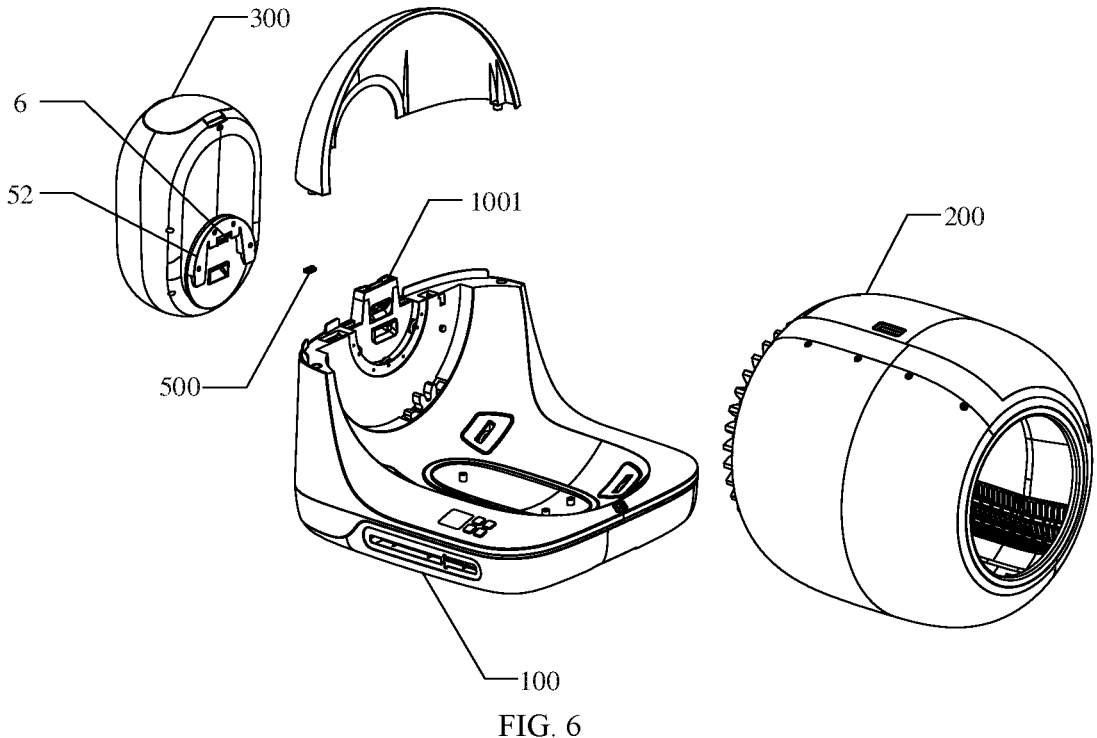
FIG. 6 is a schematic diagram of the decomposition structure of an embodiment of the cat litter box.
Figure 7:
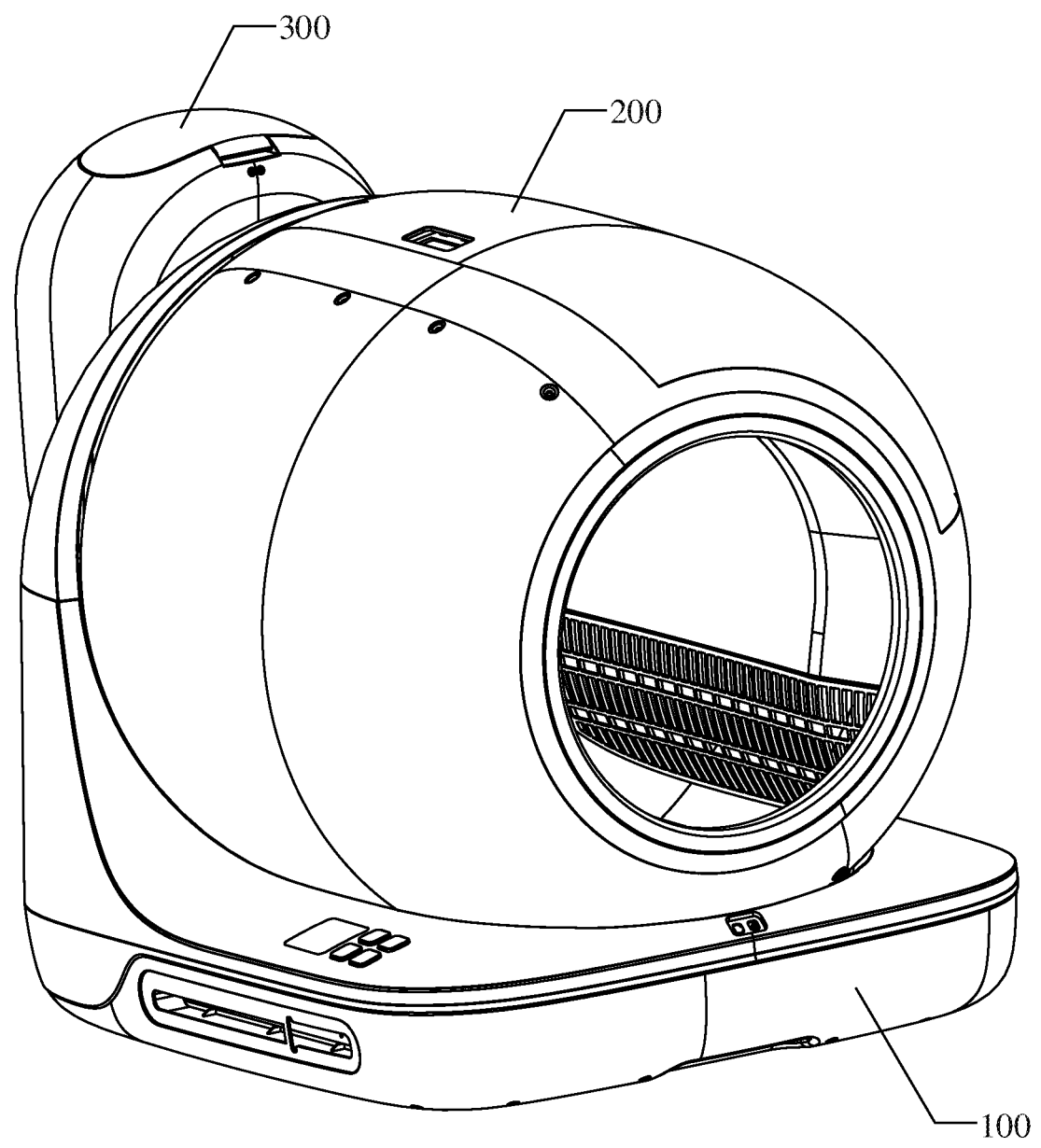
FIG. 7 is a schematic diagram of the overall structure of an embodiment of the cat litter box.

FIG. 6 and FIG. 7 show the structural schematic diagrams of an embodiment of the cat litter box. Referring to FIG. 6 and FIG. 7, the cat litter box comprises a base 100, a drum 200 rotatably arranged on the base 100, a driving assembly (not shown in the figure) for driving the drum 200 to rotate, and the automatic pet litter adding device 300 of one of the above embodiments, wherein the automatic pet litter adding device 300 is connected to the base 100, and the second pet litter outlet of the automatic pet litter adding device 300 is connected to the inside of the drum 200.

Specifically, the second pet litter outlet of the automatic pet litter adding device 300 is connected to the inside of the drum 200, so that the pet litter in the automatic pet litter adding device 300 can automatically slide into the inside of the drum 200, and pet litter is automatically added to the inside of the drum 200. The driving assembly is used to drive the drum 200 to rotate. On the one hand, the rotation of the drum 200 is to collect cat feces, and on the other hand, the pet litter in the drum 200 is more evenly distributed at the bottom of the drum 200, rather than being accumulated at one end of the drum 200 adjacent to the automatic pet litter adding device 300.

In this embodiment, the automatic pet litter adding device 300 is provided to automatically add pet litter into the drum 200, without the need for manual pet litter adding, and improving the user experience.

It should be noted that the automatic pet litter adding device 300 is provided with a clamping piece 52, and the base 100 is provided with a snap-fitting socket 1001 matching the clamping piece 52. The automatic pet litter adding device 300 is fixed by inserting the clamping piece 52 into the snap-fitting socket 1001. In this embodiment, the automatic pet litter adding device 300 is detachably mounted on the base 100 by the cooperation of the clamping piece 52 and the snap-fitting socket 1001. When the user needs to move the cat litter box or does not need to use the automatic pet litter adding device 300, the automatic pet litter adding device 300 can be removed from the base 100.

Furthermore, the cat litter box comprises a controller (not shown in the figure) and a data plug 500, the data plug 500 and the driving assembly are electrically connected to the controller respectively, the automatic pet litter adding device 300 also comprises the communication interface 6, the communication interface 6 is electrically connected to the motor assembly 4 of the automatic pet litter adding device 300, when the automatic pet litter adding device 300 is set on the base 100, the data plug 500 is inserted into the communication interface 6, and the controller is provided with a wireless connection module (not shown in the figure).

Specifically, by setting the wireless connection module on the controller, the users can establish a wireless connection between the mobile device and the controller, and then remotely control the operation of the cat litter box on the mobile device to achieve the remote pet litter adding operations on the cat litter box. In addition, the controller can also control the driving assembly to work every time after the cat has finished defecating, and the driving assembly drives the drum 200 to rotate, so that the cat feces in the drum 200 are separated, and then the controller transmits a signal to the motor component of the automatic pet litter adding device 300 through the data plug 500 and the communication interface 6 to drive the automatic pet litter adding device 300 to add pet litter into the drum 200.

Figure 8:
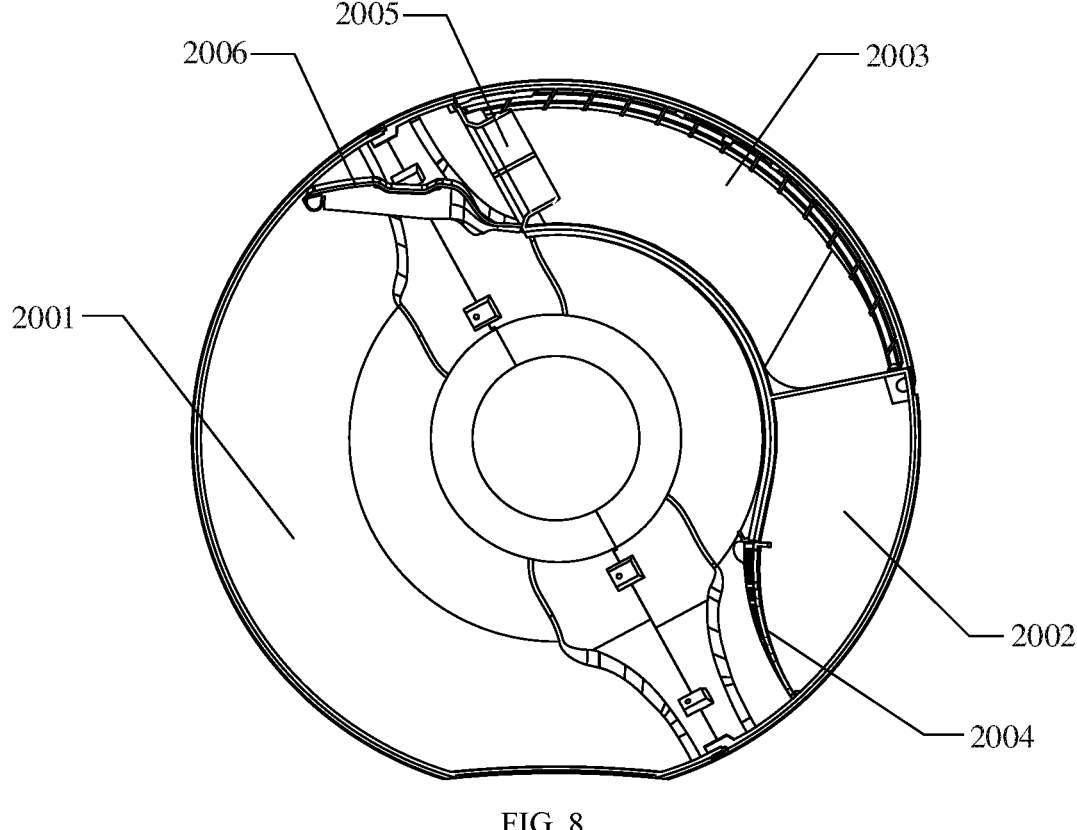
FIG. 8 is a schematic diagram of the cross-sectional structure of the drum of an embodiment of the cat litter box.
Figure 9:
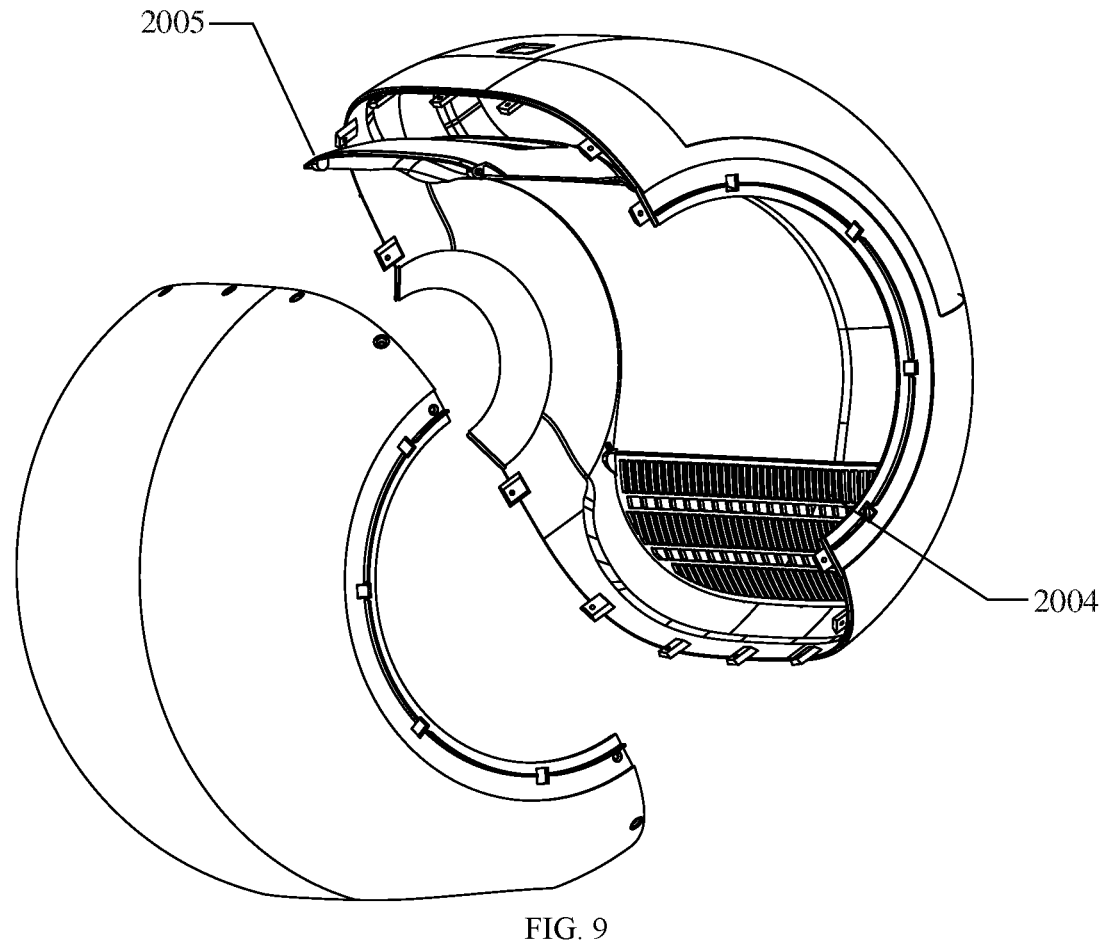
FIG. 9 is a schematic diagram of the decomposition structure of the drum of an embodiment of the cat litter box.

It should be noted that, referring to FIG. 8 and FIG. 9, the drum 200 includes an excretion cabin 2001, a pet litter temporary storage cabin 2002 and a cat feces collection cabin 2003. The pet litter temporary storage cabin 2002 and the excretion cabin 2001 are connected via a mesh screen 2004, and the grids of the mesh screen 2004 are just large enough to accommodate pet litter. An entrance 2005 is provided on one side of the cat feces collection cabin 2003, and a cabin door 2006 is provided at the entrance 2005. One side of the cabin door 2006 is rotatably connected to the inner wall of the drum 200, and the other side just covers the entrance 2005. Furthermore, the cat feces collecting cabin 2003 is detachable and can be directly removed from the drum 200 to facilitate the processing of the cat feces therein.

Figure 10:
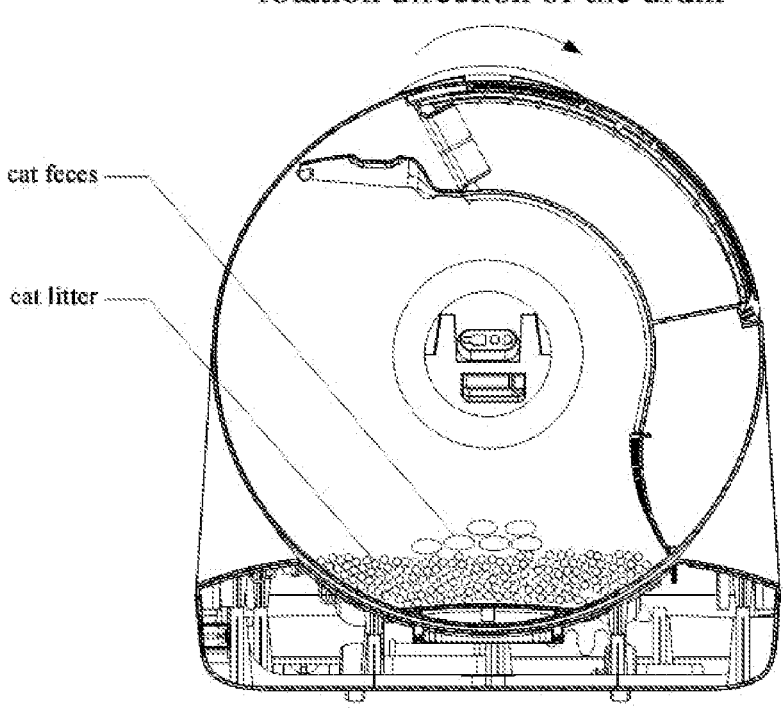
FIGS. 10-13 are schematic diagrams of the process of the cat litter box of the present invention when it is working.
Figure 11:
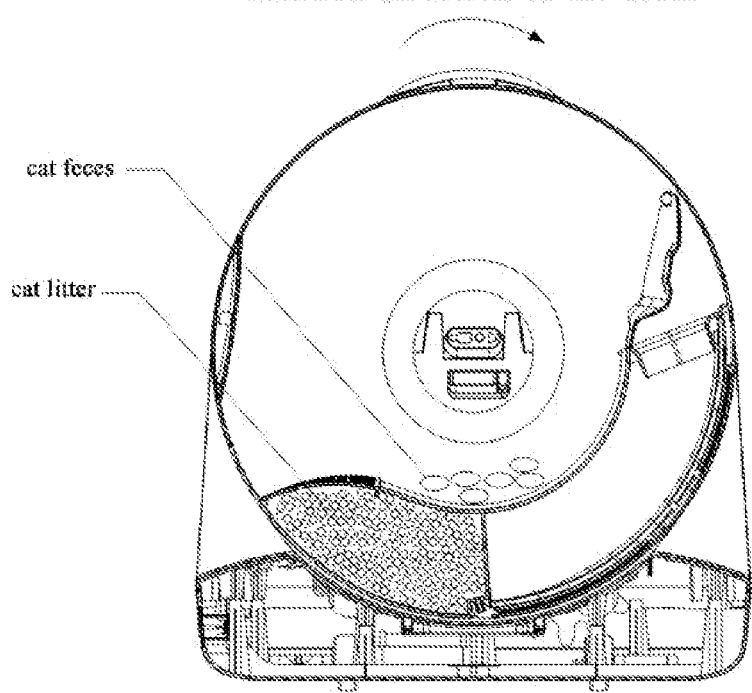
Figure 12:
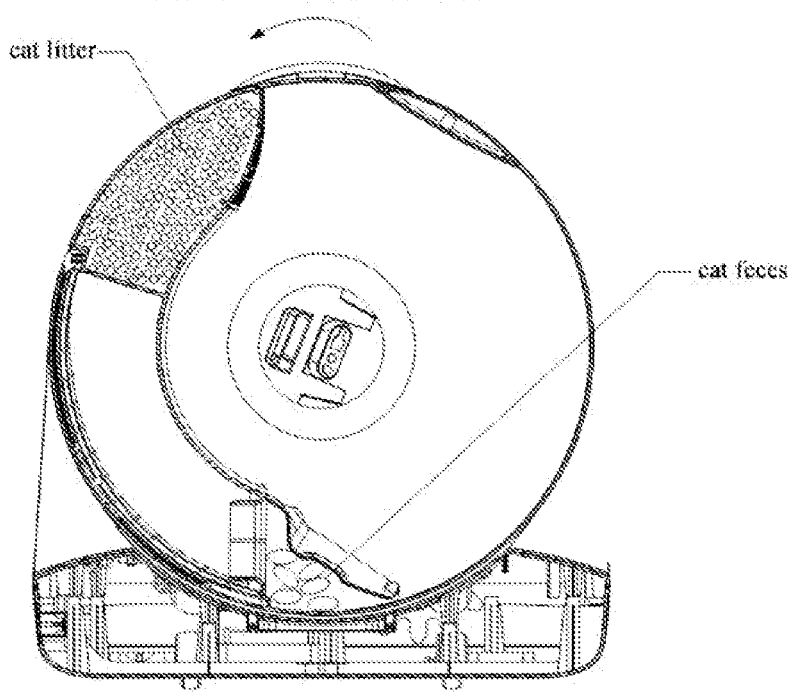
Figure 13:
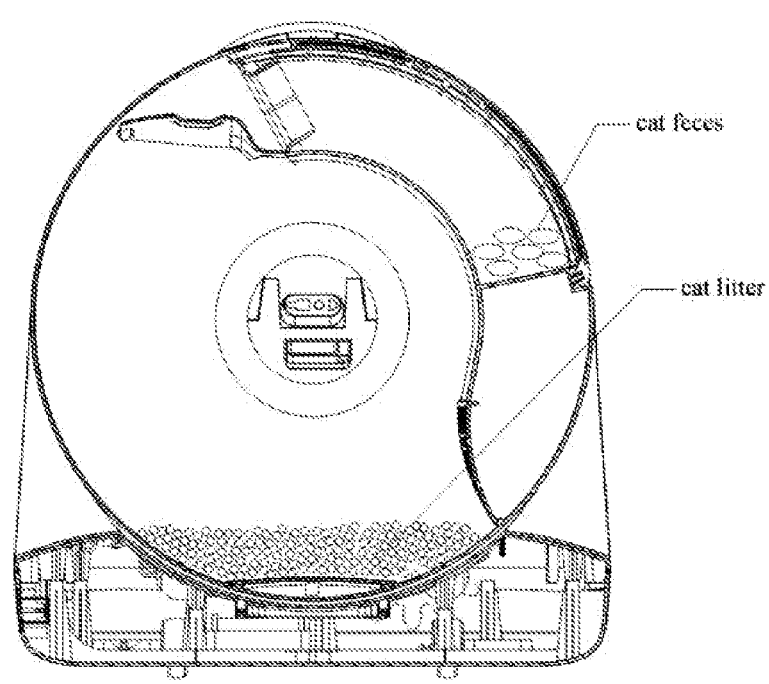

Specifically, please refer to FIGS. 10 to 13 together. In the initial state, as shown in FIG. 10, the pet litter temporary storage cabin 2002 and the cat feces collection cabin 2003 are both located on the upper side of the drum 200. After the cat has finished defecating, the driving assembly drives the drum 200 to rotate along the first preset direction, during the process of rotating to the bottom of the pet litter temporary storage cabin 2002, the pet litter in the excretion cabin 2001 slides from the mesh screen 2004 into the pet litter temporary storage cabin 2002 (as shown in FIG. 11). The clumped cat feces are left in the excretion cabin 2001. When the drum 200 continues to rotate along the first preset direction until the cat feces collection cabin 2003 is at the bottom, the clumped cat feces squeeze the cabin door 2006 under the action of gravity, and the cabin door 2006 opens, and the cat feces fall between the entrance 2005 and the cabin door 2006 (as shown in FIG. 12). Then the driving assembly drives the drum 200 to rotate along the second preset direction until it returns to its original position, and the cat feces falls into the cat feces collection cabin 2003 from the entrance 2005, and the pet litter in the pet litter temporary storage cabin 2002 slides from the mesh screen 2004 into the excretion cabin 2001 (as shown in FIG. 13), thereby achieving the automatic collection of the cat faeces in the excretion cabin 2001, without the need for manual collection, thereby improving the user experience.

Above are only preferred embodiments of the present disclosure and are not intended to limit the present disclosure. Any modification, equivalent replacement and improvement made within spirit and principle of the present disclosure should be included in protection scope of the present disclosure.

What is claimed is:

1. An automatic pet litter adding device, comprising: a pet litter cabin, a support plate, a pet litter adding component, a motor assembly; wherein:

the bottom of the pet litter cabin is provided with a first pet litter outlet;

the support plate is provided with a pet litter dividing trough located at the bottom of the first pet litter outlet, the bottom of the pet litter dividing trough is provided with a second pet litter outlet, and the first pet litter outlet and the second pet litter outlet are staggered;

the pet litter adding component is rotatably arranged in the pet litter dividing trough, the pet litter adding component divides a pet litter dividing area in the pet litter dividing trough, when the pet litter adding component rotates, the cat litter in the pet litter cabin slides to the pet litter dividing area, and the cat litter in the pet litter dividing area is pushed to the second pet litter outlet, and slides from the second pet litter outlet to the designated area;

the output end of the motor assembly is connected to the pet litter adding component;

the pet litter adding component comprises a pet litter dividing component and a rotating shaft component, the bottom of the pet litter cabin is provided with a pair of blocks, and the pair of blocks are provided on both sides of the first pet litter outlet;

the pet litter dividing component comprises at least two fan-shaped cylindrical parts and a rotating cylinder part, the rotating cylinder part is rotatably sleeved on the rotating shaft component, the two fan-shaped cylindrical parts are arranged on the rotating cylinder part, the top surface of the fan-shaped cylindrical parts are adjacent to the bottom of the blocks, at least two pet litter dividing areas are formed between the fan-shaped cylindrical part and the inner wall of the pet litter dividing trough, the size of the top surface of the fan-shaped cylindrical parts and the size of the pet litter dividing areas are respectively matched with the size of the first pet litter outlet and the size of the second pet litter outlet, when the pet litter dividing component rotates, the two pet litter dividing areas pass through the first pet litter outlet or the second pet litter outlet, and the cat litter in the pet litter cabin slides from the first pet litter outlet to the pet litter dividing areas, or the cat litter in the pet litter dividing areas slides from the second pet litter outlet to the designated area.

2. The automatic pet litter adding device of claim 1, wherein the top of the rotating shaft component penetrates the bottom of the pet litter cabin and extends into the pet litter cabin, and a stirring member is arranged on the top of the rotating shaft component.

3. The automatic pet litter adding device of claim 1, wherein the blocks are arranged in a comb shape, and the gap between comb teeth of the comb shape blocks is smaller than the diameter of the pet litter.

4. An automatic pet litter adding device, comprising: a pet litter cabin, a support plate, a pet litter adding component, a shell, and a motor assembly; wherein:

the bottom of the pet litter cabin is provided with a first pet litter outlet;

the support plate is provided with a pet litter dividing trough located at the bottom of the first pet litter outlet, the bottom of the pet litter dividing trough is provided with a second pet litter outlet, and the first pet litter outlet and the second pet litter outlet are staggered;

the pet litter adding component is rotatably arranged in the pet litter dividing trough, the pet litter adding component divides a pet litter dividing area in the pet litter dividing trough, when the pet litter adding component rotates, the cat litter in the pet litter cabin slides to the pet litter dividing area, and the cat litter in the pet litter dividing area is pushed to the second pet litter outlet, and slides from the second pet litter outlet to the designated area;

the output end of the motor assembly is connected to the pet litter adding component;

the pet litter cabin, the support plate, the pet litter adding component, and the motor assembly are all arranged in the shell, the shell is provided with an opening, and a slide is provided at the bottom of the support plate, one end of the slide abuts against the second pet litter outlet, and the other end of the slide passes through the opening and extends to the designated area.

5. The automatic pet litter adding device of claim 4, wherein the top of the shell is provided with a cabin cover, one side of the cabin cover is rotatably connected to the shell.

6. The automatic pet litter adding device of claim 4, wherein the shell is provided with a clamping piece.

7. The automatic pet litter adding device of claim 1, wherein the pet litter cabin is arranged in an inverted cone shape.

8. A cat litter box, comprising: a base, a drum rotatably arranged on the base, a driving assembly for driving the drum to rotate, and the automatic pet litter adding device according to claim 1, wherein the automatic pet litter adding device is connected to the base, and the second pet litter outlet of the automatic pet litter adding device is connected to the inside of the drum.

9. The cat litter box of claim 8, wherein the cat litter box further comprises a controller and a data plug, the data plug and the driving assembly are electrically connected to the controller respectively, the automatic pet litter adding device also comprises a communication interface, the communication interface is electrically connected to the motor assembly of the automatic pet litter adding device, when the automatic pet litter adding device is set on the base, the data plug is inserted into the communication interface, and the controller is provided with a wireless connection module.

\* \* \* \* \*